United States Patent [19]
Kikinis

[11] Patent Number: 5,880,719
[45] Date of Patent: *Mar. 9, 1999

[54] LOW-POWER-CONSUMPTION MONITOR STANDBY SYSTEM

[75] Inventor: Dan Kikinis, Sunnyvale, Calif.

[73] Assignee: Eloney I.P. Holdings L.T.D., United Kingdom

[*] Notice: The term of this patent shall not extend beyond the expiration date of Pat. No. 5,389,952.

[21] Appl. No.: 893,847

[22] Filed: Jul. 11, 1997

Related U.S. Application Data

[63] Continuation of Ser. No. 591,775, Feb. 7, 1996, Pat. No. 5,648,799, which is a continuation of Ser. No. 319,256, Oct. 6, 1994, abandoned, which is a continuation of Ser. No. 141,413, Oct. 22, 1993, Pat. No. 5,389,952, which is a continuation of Ser. No. 984,370, Dec. 2, 1992, abandoned.

[51] Int. Cl.⁶ .............................. G09G 5/00; G09G 5/12; H04N 5/63
[52] U.S. Cl. ......................... 345/212; 345/213; 348/730; 395/750.06
[58] Field of Search .............................. 345/10, 211–213; 348/634, 730, 734; 364/707; 395/750.01, 750.03, 750.06; H04N 5/63

[56] References Cited

U.S. PATENT DOCUMENTS

| | | |
|---|---|---|
| 3,453,601 | 7/1969 | Bogert et al. . |
| 3,588,608 | 6/1971 | Halinski et al. . |
| 3,941,989 | 3/1976 | McLaughlin et al. . |

(List continued on next page.)

FOREIGN PATENT DOCUMENTS

| | | |
|---|---|---|
| 0444997 | 9/1991 | European Pat. Off. . |
| 488384 | 6/1992 | European Pat. Off. . |
| 57-123598 | 8/1982 | Japan . |
| 60-090476 | 5/1985 | Japan . |

(List continued on next page.)

OTHER PUBLICATIONS

"Environmental Labelling of Display Units", Presented at the Third International Scientific Conference, Sep. 1992, pp. 1–4.
"Department of Energy Efficiency", NUTEK, Jun. 1992, pp. 1–8.
IBM Technical Disclosure Bulletin, "Increasing Lifetime and Reliability of CRT Displays", vol. 34, No. 9: Feb. 1992, pp. 281–283.
"Auto turn–off monitors", NUTEK, 1992, pp. 1–4. EDGE: Work–Group Computing Report, Mar. 18, 1991 v2 n43, p. 28(1) Notebook Display . . . author Phoenix Technologies Ltd. (Product Announcement).
PC Week, Feb. 11, 1991 v8 n6, p. 5(1) PS/2 L40SX packs design novelties . . . author Michael Caton. "Who's Using Your Electricity When Your Not There", NUTEK, pp. 1–8.
"Vesa Proposal; 'Power Save' Mode:", Video Electronics Standards Association, 2150 North First Street, Suite 440, San Jose, CA 95131–2020.
"Monitors Sport Extra Features to Lure Users" InfoWorld Oct. 5, 1992, IDG Communications, Inc. (p. 397) Copyright 1992 (Abstract).

(List continued on next page.)

*Primary Examiner*—Jeffery Brier
*Attorney, Agent, or Firm*—Donald R. Boys

[57] ABSTRACT

A system for managing power states for a video display monitor for a computer during periods of operator inactivity senses the presence or absence of signals provided to the video display monitor for forming an image on the monitor, such as red (R), green (G), blue (B) and horizontal synchronization (HSYNC) and vertical synchronization (VSYNC) signals. Time sensing apparatus at the host senses input activity, and in one embodiment suspends a signal provided to the monitor. Sensing and control circuits in the monitor sense the absence of the signal normally supplied to the monitor, and control power-using circuitry in the monitor in response. In an embodiment applicable to monitors having a microprocessor, the system may be incorporated entirely in software at the host and the monitor. In dumb monitors the system requires add-in or add-on devices cooperating with software.

4 Claims, 6 Drawing Sheets

U.S. PATENT DOCUMENTS

| | | |
|---|---|---|
| 4,338,623 | 7/1982 | Asmus et al. . |
| 4,404,500 | 9/1983 | Stow . |
| 4,488,181 | 12/1984 | Hafed . |
| 4,532,457 | 7/1985 | Hafed . |
| 4,553,166 | 11/1985 | Sutton . |
| 4,649,373 | 3/1987 | Bland et al. . |
| 4,667,289 | 5/1987 | Yoshida et al. . |
| 4,722,005 | 1/1988 | Ledenbach . |
| 4,751,502 | 6/1988 | Ishii et al. . |
| 4,806,784 | 2/1989 | Goda . |
| 4,823,121 | 4/1989 | Sakamoto et al. . |
| 4,922,448 | 5/1990 | Kunieda et al. . |
| 4,980,836 | 12/1990 | Carter et al. . |
| 5,021,983 | 6/1991 | Nguyen et al. . |
| 5,055,940 | 10/1991 | Tomatsuri . |
| 5,059,961 | 10/1991 | Cheng . |
| 5,079,666 | 1/1992 | Najm . |
| 5,089,754 | 2/1992 | George . |
| 5,167,024 | 11/1992 | Smith et al. . |
| 5,178,152 | 1/1993 | Ozawa . |
| 5,226,122 | 7/1993 | Thayer et al. . |
| 5,237,692 | 8/1993 | Raasch et al. . |
| 5,245,312 | 9/1993 | Kinichi et al. . |
| 5,315,311 | 5/1994 | Honkala . |
| 5,321,339 | 6/1994 | Hunt . |
| 5,369,771 | 11/1994 | Gettel . |
| 5,396,635 | 3/1995 | Fung . |
| 5,423,045 | 6/1995 | Kannan et al. . |
| 5,430,881 | 7/1995 | Ikeda . |
| 5,457,801 | 10/1995 | Aihara . |
| 5,471,621 | 11/1995 | Ohtsuki . |
| 5,483,464 | 1/1996 | Song . |

FOREIGN PATENT DOCUMENTS

| | | |
|---|---|---|
| 62-106523 | 5/1987 | Japan . |
| 62-216018 | 9/1987 | Japan . |
| 62-262250 | 11/1987 | Japan . |
| 62-276973 | 12/1987 | Japan . |
| 63-121365 | 5/1988 | Japan . |
| 2-24696 | 7/1988 | Japan . |
| 63-261229 | 10/1988 | Japan . |
| 1257893 | 10/1989 | Japan . |
| 2-24696 | 1/1990 | Japan . |
| 214871 | 1/1990 | Japan . |
| 2-053126 | 2/1990 | Japan . |
| 2-56620 | 2/1990 | Japan . |
| 2-280587 | 11/1990 | Japan . |
| 3-091798 | 4/1991 | Japan . |
| 3-105561 | 5/1991 | Japan . |
| 3-214871 | 9/1991 | Japan . |
| 3-238516 | 10/1991 | Japan . |
| 4-062614 | 2/1992 | Japan . |
| 4-095146 | 3/1992 | Japan . |
| 4-096811 | 3/1992 | Japan . |
| 4-107623 | 4/1992 | Japan . |
| 4-107624 | 4/1992 | Japan . |
| 4-140826 | 5/1992 | Japan . |
| 4-188972 | 7/1992 | Japan . |
| 4-195091 | 7/1992 | Japan . |
| 4-205020 | 7/1992 | Japan . |
| 4-245518 | 9/1992 | Japan . |
| 4-290388 | 10/1992 | Japan . |
| 4-344692 | 12/1992 | Japan . |
| 5-094163 | 4/1993 | Japan . |
| 9204394 | 6/1992 | Rep. of Korea . |
| WO89/06012 | 6/1989 | WIPO . |

OTHER PUBLICATIONS

"Nanao to Introduce Low–Cost 15–inch Windows Monitor" PC Week vol. 9, No. 42, Oct. 19, 1992, Ziff–Davis Publishing Company (p. 30) Copyright 1992 (Abstract).

"Into the Station: Memorex Telex Releases the 1477 CX Color Display Station and the 1236 Line Printer" Midrange Systems vol. 5, No. 14 Jul. 21, 1992 Cardinal Business Media Inc. (p. 57) Copyright 1992 (Abstract).

Paradise VGA Plus® Card Manual appendix D, 1988. IBM Personal System/2® and Personal Computer BIOS Interface Technical Reference pp. 4–59 to 4–61 and 4–121 to 4–125, Apr. 1987.

LOW-POWER-CONSUMPTION MONITOR STANDBY SYSTEM

CROSS-REFERENCE TO RELATED APPLICATIONS

The present application is a continuation of application Ser. No. 08/591,775, filed Feb. 7, 1996, now U.S. Pat. No. 5,648,799, issued Jul. 15, 1997, which is a continuation of Ser. No. 08/319,256, filed Oct. 6, 1994, now abandoned, which is a continuation of Ser. No. 08/141,413, filed Oct. 22, 1993, now U.S. Pat. No. 5,389,952 issued Feb. 14, 1995, which is a continuation of Ser. No. 07/984,370, filed Dec. 2, 1992, now abandoned.

FIELD OF THE INVENTION

The present invention is in the field of automatic power saving devices and pertains in particular to reduction of power consumption by computer video monitors.

BACKGROUND OF THE INVENTION

A typical color video monitor may consume as much as 50 to 80 percent of the total electrical energy consumed by a personal computer (PC). A video monitor dissipates this energy as visible light emissions from screen phosphors, thermal waste, electromagnetic radiation, high-energy radiation and acoustic energy. Only the phosphor emissions are normally considered useful and then only when actively being watched by an observer. The radiation emissions have been a hotly debated source of concern regarding possible health risks from long-term exposure. Manufacturers incur considerable extra expense to reduce radiation emissions from video monitors. Some people are annoyed by the acoustic emissions produced by some monitors. Thermal losses from video monitors contribute an additional load on air conditioning equipment. The energy efficiency of video monitors has historically improved mostly as a result of advances in the electronic circuit components such as the increased use of integrated circuit (IC) devices. Cathode ray tube (CRT) technology has improved rather little in terms of energy efficiency.

The number of PC's in regular use is growing rapidly and has reached a point where they have become major consumers of electric power. The United States Environmental Protection Agency has issued power efficiency targets for computer manufacturers to design for in new systems. Low-voltage IC's use less energy, and microprocessor power management techniques allow a computer to reduce energy consumption when idling. Until a suitable replacement for the CRT or a more efficient CRT is developed it will be difficult to substantially improve personal computer energy efficiency.

What is needed is a way to shut down high-energy-consuming circuits in the video monitor when the computer determines that the display may be of no interest to anyone. This might be determined by a period of inactivity on input devices such a modem, mouse and keyboard. Many computers and video terminals use such a technique to activate a screen blanking circuit or a program that displays moving images (or no image) to avoid burning the screen phosphors. Activating an input device such as pressing a key or moving a mouse causes the previous screen image to be restored. This technique can be extended to reduce video monitor power consumption by signalling the microcontroller found in many recent design monitors, or an add-on device for "dumb" monitors, to shut down or restore some or all of the monitor's electrical power circuits. One key to accomplishing this end is a means of signalling a monitor to shut down to some selected level without adding to the signals presently provided to a monitor.

SUMMARY OF THE INVENTION

In an embodiment of the present invention a system is provided for a general purpose computer having a CPU, a memory means, a monitor, and video signal means for providing horizontal sync (HSYNC) and vertical sync (VSYNC) signals to the monitor, to signal the monitor to assume alternative states. The system comprises timing means for measuring periods of inactivity configured to reset to zero on input interrupts and to provide overflow signals at preset overflow values, and sync disabling means for interrupting at least one of the HSYNC and VSYNC signals to the monitor according to overflow states of the timing means.

In one embodiment the video signal means comprises video adapter circuitry having a VSYNC generator and an HSYNC generator, and the disabling means comprises a register associated with the video adapter circuitry, wherein one bit in the register is a vertical retrace polarity bit, and another bit is a horizontal retrace polarity bit. The timing means is provided by the CPU following a monitor power management instruction routine stored in the memory means, and SYNC signals are disabled by the CPU writing to the register. The monitor power management routine may be stored in the system BIOS.

In an alternative embodiment the system is implemented by an add-in time-out controller with sensing means for sensing user input interrupts, and the disabling means comprises at least one switch operable by the time-out controller and placed in a line carrying one of the HSYNC and VSYNC signals. In yet another alternative the system may be accomplished by an add-on (external) time-out controller connected to interface devices at the ports where user input devices are connected. The interface devices monitor input interrupts, and the add-on time-out controller is connected to an interrupt device at the monitor port for interrupting SYNC signals.

In another aspect the invention involves a CRT monitor configured to respond to power level signals from a host computer. The monitor comprises a SYNC detector for monitoring the presence of VSYNC and HSYNC signals from the host, and power level control means for shutting down power circuitry in the CRT monitor in response.

In yet another aspect a power system for a monitor is provided with an external SYNC detector placed in the monitor cable to the host. This controller drives a switch that controls AC mains power to the monitor.

A computer system according to the invention comprises timing means configured to reset to zero on system interrupts, SYNC disabling means for interrupting SYNC signals to a monitor, SYNC detector means associated with the monitor for sensing the presence of SYNC signals at the monitor, and power level control means associated with the monitor for shutting down power-using circuitry in the monitor in response to the presence of SYNC signals.

In yet another aspect a method is provided for saving power for a video display monitor comprising steps of sensing input interrupts from user operated devices, resetting a timer to zero on receipt of such interrupts, providing a first power level signal to the monitor based on disabling at least one of a VSYNC and an HSYNC signal to the monitor, providing a second power level signal in a different configuration than for the first power level signal, sensing presence of the SYNC signals at the monitor, and shutting down power circuitry in response to the power level signals. A cathode heater is left on for presence of the first signal, and power is shut off completely in response to receipt of the second signal.

The present invention in these several aspects provides a way to save power at a monitor, and minimize radiation emissions as well, in response to periods of inactivity, utilizing to a great extent, existing elements and capabilities of a general-purpose computer.

DESCRIPTION OF THE PREFERRED EMBODIMENT

Figure 1:
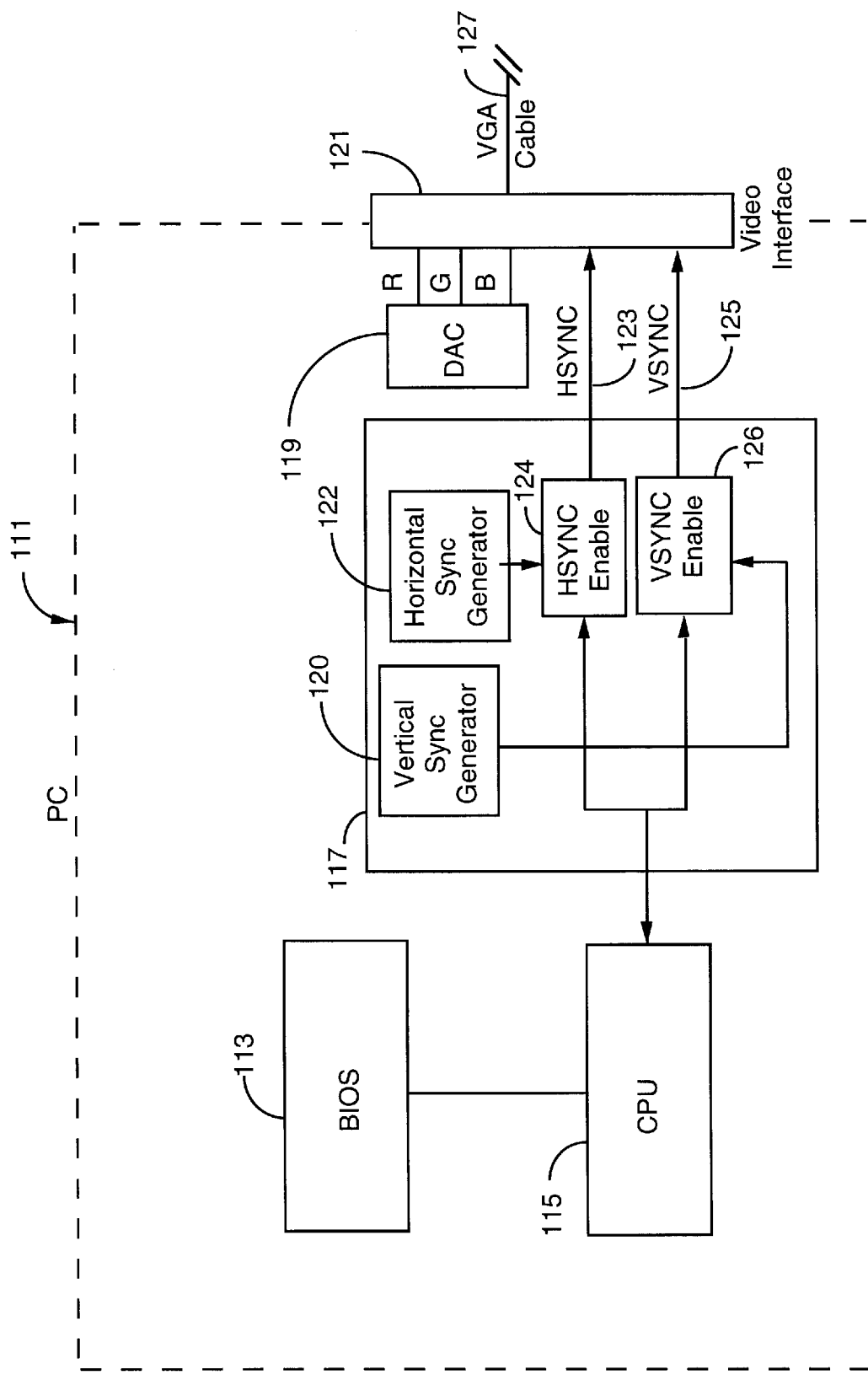
FIG. 1 is a largely schematic representation of a PC according to an embodiment of the present invention.

FIG. 1 shows the functional elements of a preferred embodiment of the present invention capable of providing 3 distinct signals to a monitor to signal the monitor to adjust to as many as three states. In an embodiment of the invention, the states are selected levels of monitor power management (MPM). The signal to the monitor is based on interrupting one or the other or both HSYNC and VSYNC signals. In the embodiment shown in FIG. 1 a PC 111 comprises a Basic Input Output System (BIOS) 113 and a Video Graphics Adapter (VGA) 117. The invention will work equally well with other video adapters, as virtually all such adapters employ HSYNC and VSYNC signals. In some other adapters, equivalent means of interrupting the HSYNC and VSYNC signals would be used.

BIOS 113 includes instructions for MPM, which can cause a central processing unit (CPU) 115 to change the state of sync-enable controls in VGA 117. In alternative embodiments instructions for implementing MPM might be embedded in operating system (OS) device driver routines or Terminate and Stay Resident (TSR) programs.

The MPM instructions monitor CPU 115 interrupts for input devices (not shown) such as the timer, keyboard and serial communication ports. MPM instructions advance a time-out counter on each timer interrupt and reset the count to an initial value on each monitored interrupt. The initial value of the MPM time-out counter may be fixed or adjustable. When the MPM time-out counter reaches a pre-set overflow value, due to cessation of monitored interrupts, instructions are executed that change the state of HSYNC Enable 124 and VSYNC Enable 126 control to disable output of horizontal synchronization signals (HSYNC) 123, produced by horizontal sync generator 122, and/or vertical synchronization signals (VSYNC) 125, produced by vertical sync generator 120, or both. A subsequent monitored interrupt causes execution of instructions that change the state of HSYNC Enable 124 and VSYNC Enable 126 control circuits to enable output of HSYNC 123 and VSYNC 125 signals from VGA 117.

In the case of a VGA controller, the enable/disable capability is through writing by the CPU into register 3C2 of the controller, wherein bits 6 and 7 are reserved for horizontal retrace polarity, and vertical retrace polarity, respectively. HSYNC 123 and VSYNC 125 and color signals are transmitted to the monitor via a VGA cable 127. The pin-out for the signals on a VGA cable is well-known, and is shown in IBM Personal System/2, model 80 Technical Reference, published by IBM in 1987.

Figure 2A:
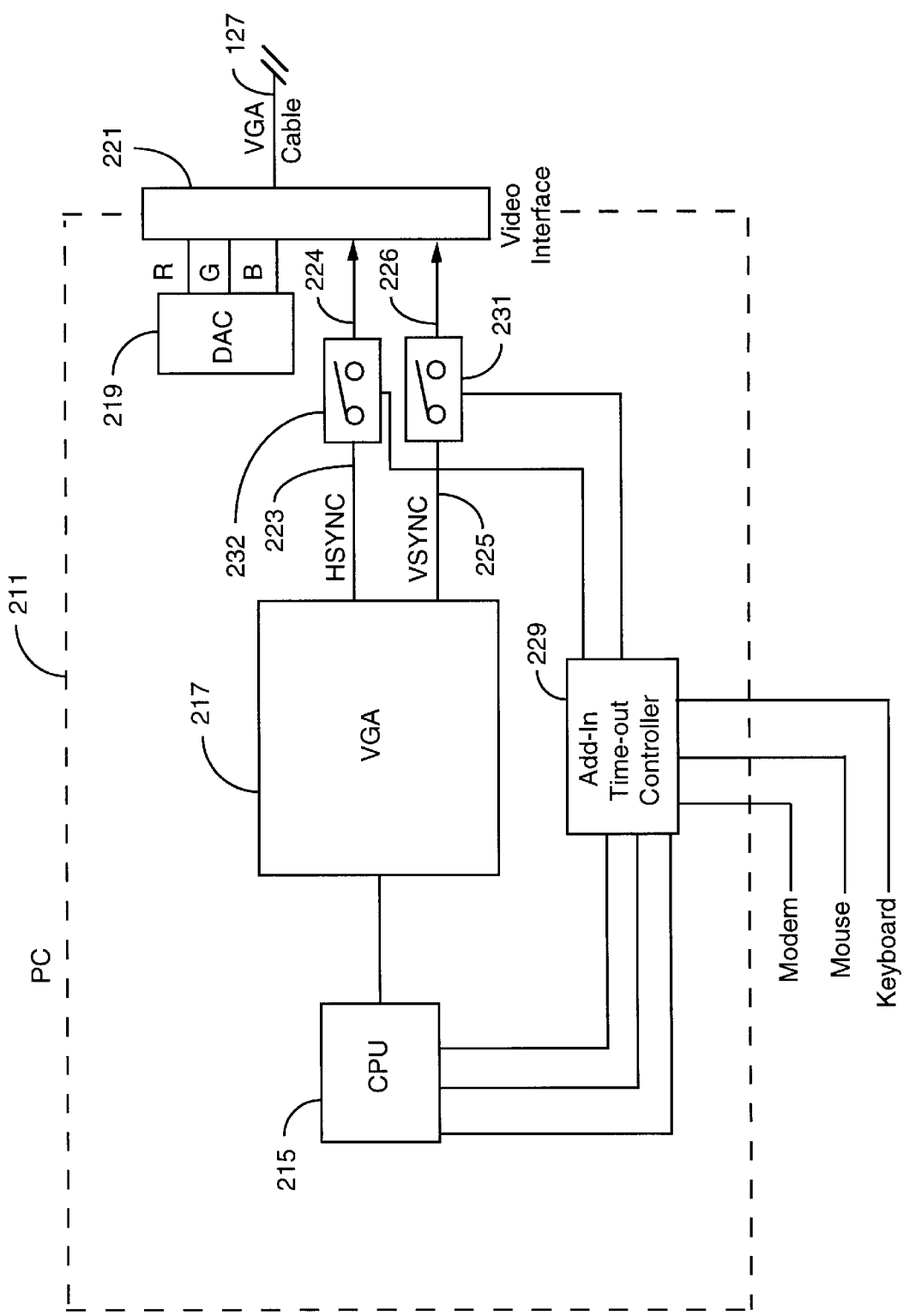
FIG. 2A is a largely schematic representation of a PC enhanced by an add-on device according to an alternative embodiment of the present invention.

In an alternative embodiment, shown in FIG. 2A, useful for refitting existing computers, a current art PC 211 having a CPU 215 is enhanced by installation of a switch 231, which connects between a VGA 217 VSYNC output 225 and VSYNC input 226 to a video interface 221. In a color computer R, G, and B signals are brought to interface 221 from DAC 219. An add-in time-out controller 229 comprising MPM instructions monitors input device activity as described above for FIG. 1. Time-out of all input devices causes instructions to be executed which change the state of program-controlled switch 231, blocking VSYNC input 225 to video interface 221. Resumption of monitored interrupts causes switch 231 to close, returning the VSYNC signals to line 226. A second switch 232 may be used in the HSYNC line to interrupt the HSYNC signals to line 224, and, in this embodiment, the add-in time-out controller controls both switches. In yet another alternative, one switch may be used to interrupt both HSYNC and VSYNC signals.

The functional blocks presented in FIG. 2A are an internal solution to an add-in hardware/software embodiment, and the blocks are not intended to be taken literally as hardware devices and interfaces. It will be apparent to one with skill in the art that there are many equivalent ways the functional blocks might be accomplished. The keyboard, mouse, and modem inputs are monitored by the add-in controller, and are made available as well to the CPU in the typical manner.

Figure 2B:
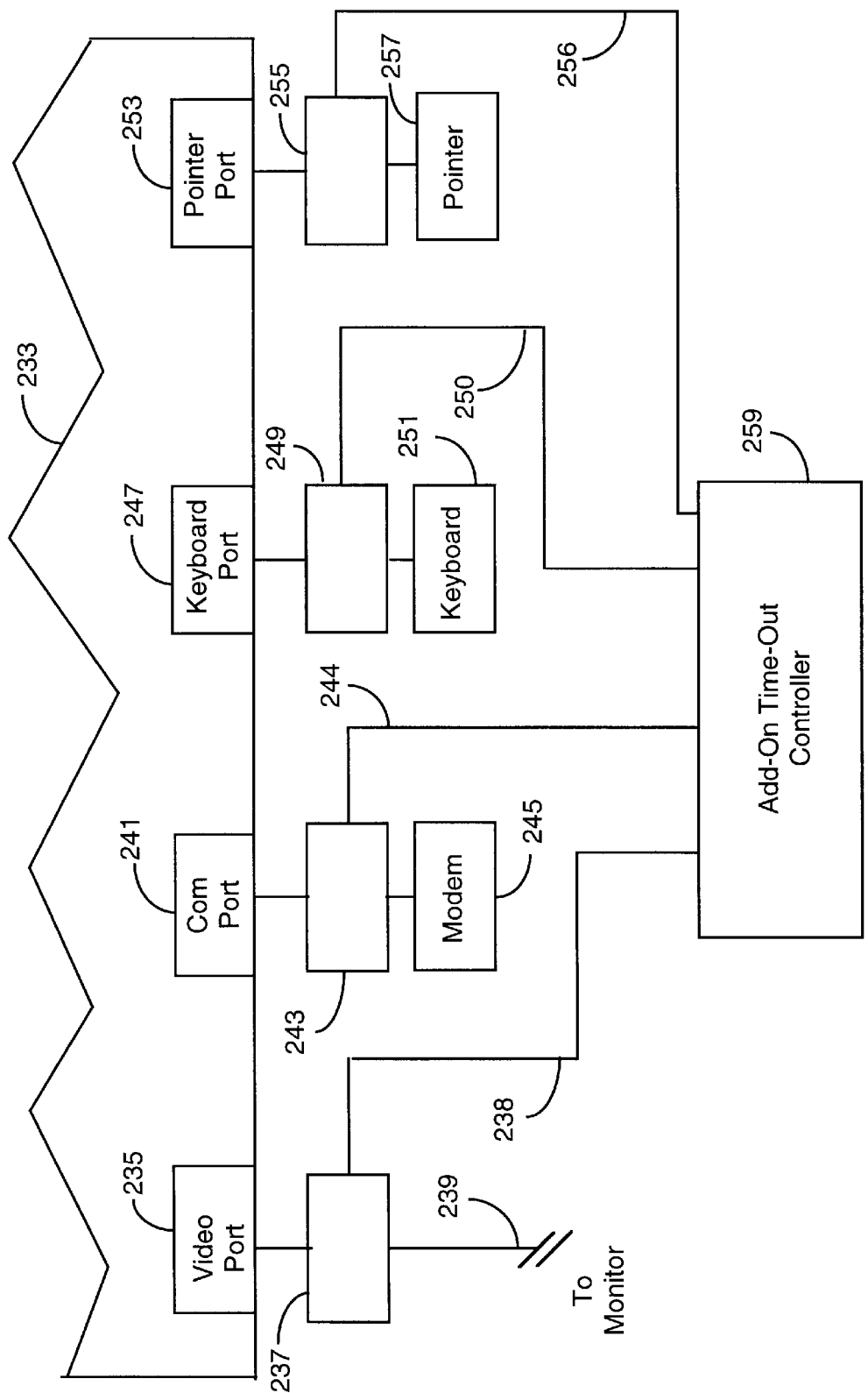
FIG. 2B is a largely schematic representation of a PC enhanced by an add-in device according to another alternative embodiment.

FIG. 2B shows an external solution for a hardware/software embodiment. In this solution an add-on time-out controller 259 is external to the computer system 233, and each port that supports an input device and the video output port is fitted with an interface device connected to the add-on time-out controller. For example, interface 243 at COM port 241 used for a modem 245 monitors modem activity and reports to controller 259 on line 244. Interface 249 at keyboard port 247 monitors keyboard 251 activity and reports to controller 259 on line 250. Interface 255 at pointer port 253 monitors pointer 257 activity (mouse, joystick, trackball), and reports to controller 259 on line 256.

In this embodiment controller 259 accomplishes the timer functions and outputs signals on line 238 to interface device 237 at video port 235. Line 239 goes to the monitor. Device 237 interrupts HSYNC and VSYNC signals according to the overflow states of add-on controller 259.

Figure 3:
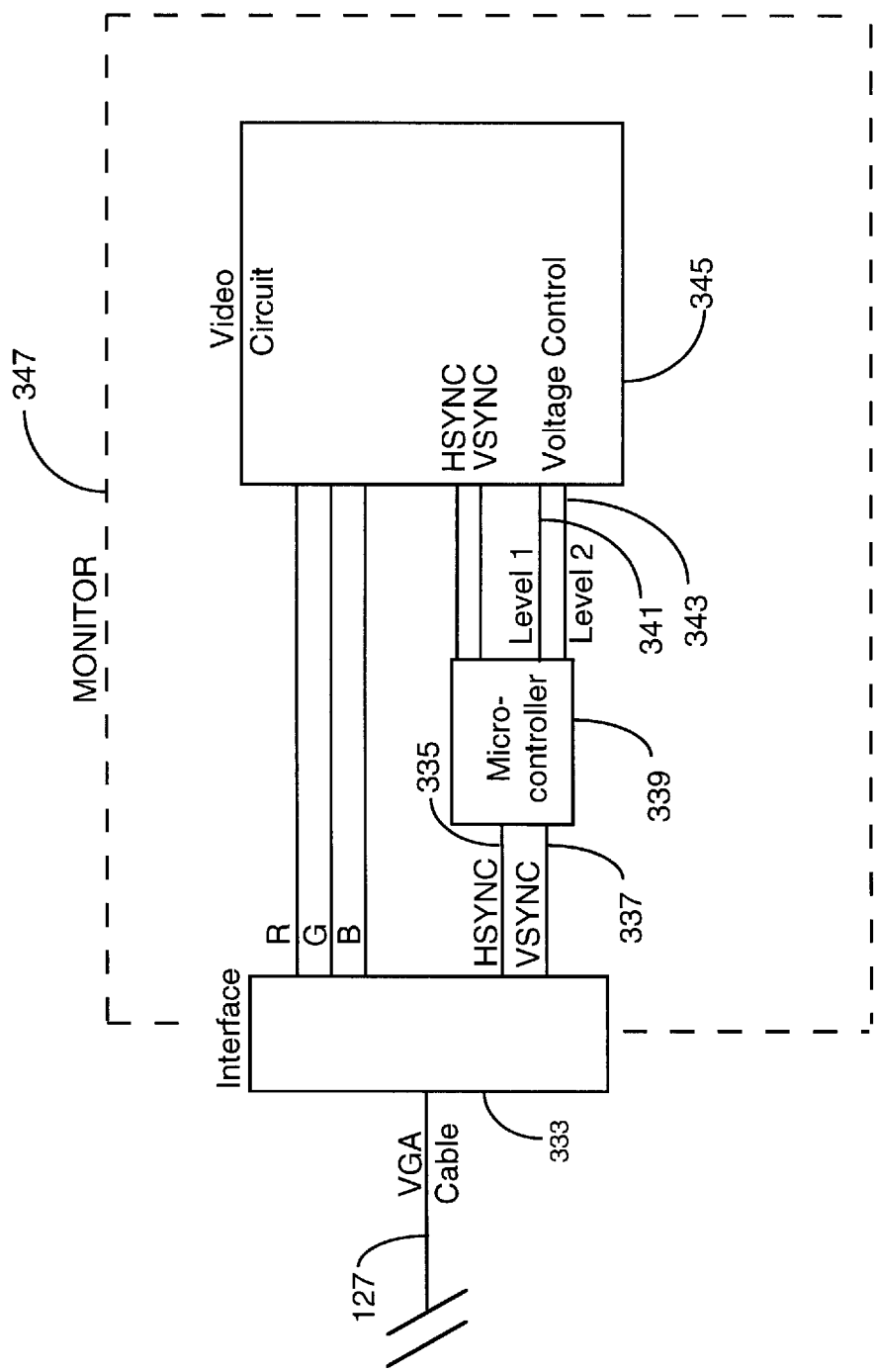
FIG. 3 is a largely schematic representation of a microcontroller-based video monitor according to an embodiment of the present invention.

A color video monitor 347 according to an embodiment of the present invention is shown in FIG. 3. Monitor 347 comprises an interface 333, a microcontroller 339 having MPM instructions according to the present invention and a video circuit (VC) 345 having voltage control circuits. Video demodulator 333 separates a video signal, received through VGA cable 127, into color signals, HSYNC pulses 335 and VSYNC pulses 337. Microcontroller 339 monitors the HSYNC signal 335 and VSYNC signal 337. The MPM instructions described above count the number of HSYNC pulses occurring between each pair of VSYNC pulses. Zero HSYNC pulses counted causes the MPM instructions in microcontroller 339 to change the voltage on Level-2 signal line 343. Similarly, an interval count of HSYNC 335 pulses greatly in excess of the maximum video scan rate for monitor 347, indicating a loss of VSYNC 337, causes microcontroller 339 to change the voltage on Level-1 signal line 341. Resumption of HSYNC 335 to VSYNC 337 pulse interval counts to a range from the minimum to the maximum scan rate causes MPM instructions in microcontroller 339 to restore quiescent voltage levels to Level-1 signal line 341 and Level-2 signal line 343.

When video circuit 345 senses an active voltage level on Level-1 signal line 341, it cuts off power to all circuits in monitor 347 except microcontroller 339, interface 333, and video circuit 345 power-control circuits (not shown). In this level 1 standby mode, power consumption of monitor 347 is reduced by more than 90 percent. If monitor 347 remains in level 1 standby for more than a few seconds, full warm-up time is required to reactivate it. An active voltage level on Level-2 signal line 343 causes video circuit 345 to cut off power to all circuits except those described above plus the CRT cathode heater. In level 2 standby mode monitor 347 power consumption is reduced by 80 to 90 percent. Because the CRT is kept hot, reactivating monitor 347 from level 2 standby requires about 5 seconds or less. Reactivation of monitor 347 occurs when voltage on Level-1 signal line 341 and Level-2 signal line 343 returns to the quiescent state allowing video circuit 345 to activate power to all circuits of monitor 347.

Figure 4:
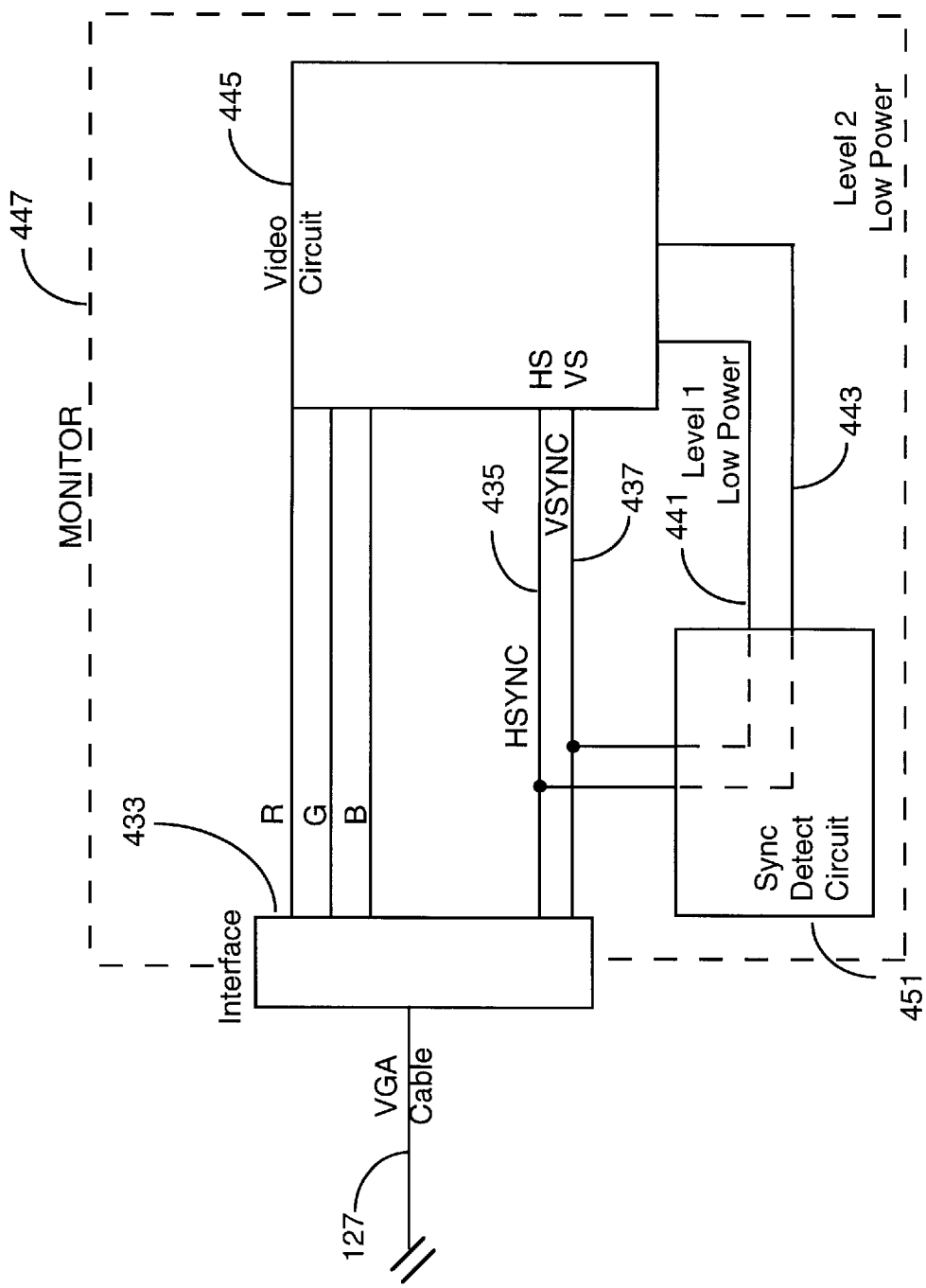
FIG. 4 is a largely schematic representation of a "dumb" monitor equipped with an add-in device according to an alternative embodiment of the present invention.

FIG. 4 shows an alternative embodiment of the present invention in a monitor 447 with video circuits functionally similar to those described for the monitor shown in FIG. 3, including an interface 433 and a video circuit 445, but without a microcontroller. A sync detect circuit 451 compares pulse intervals for HSYNC 435 and VSYNC 437 against time-constants of adequate duration to allow for brief interruptions of sync pulses. Loss of HSYNC 435 pulses or VSYNC 437 pulses for periods longer than the associated time-constants causes sync detector circuit 451 to change Level-1 signal line 441 or Level-2 signal line 443 voltage to its active state as described for FIG. 3 and with the same results. Similarly, resumption of HSYNC 435 and VSYNC 437 pulses reactivates monitor 447 as described for FIG. 3 above.

Figure 5:
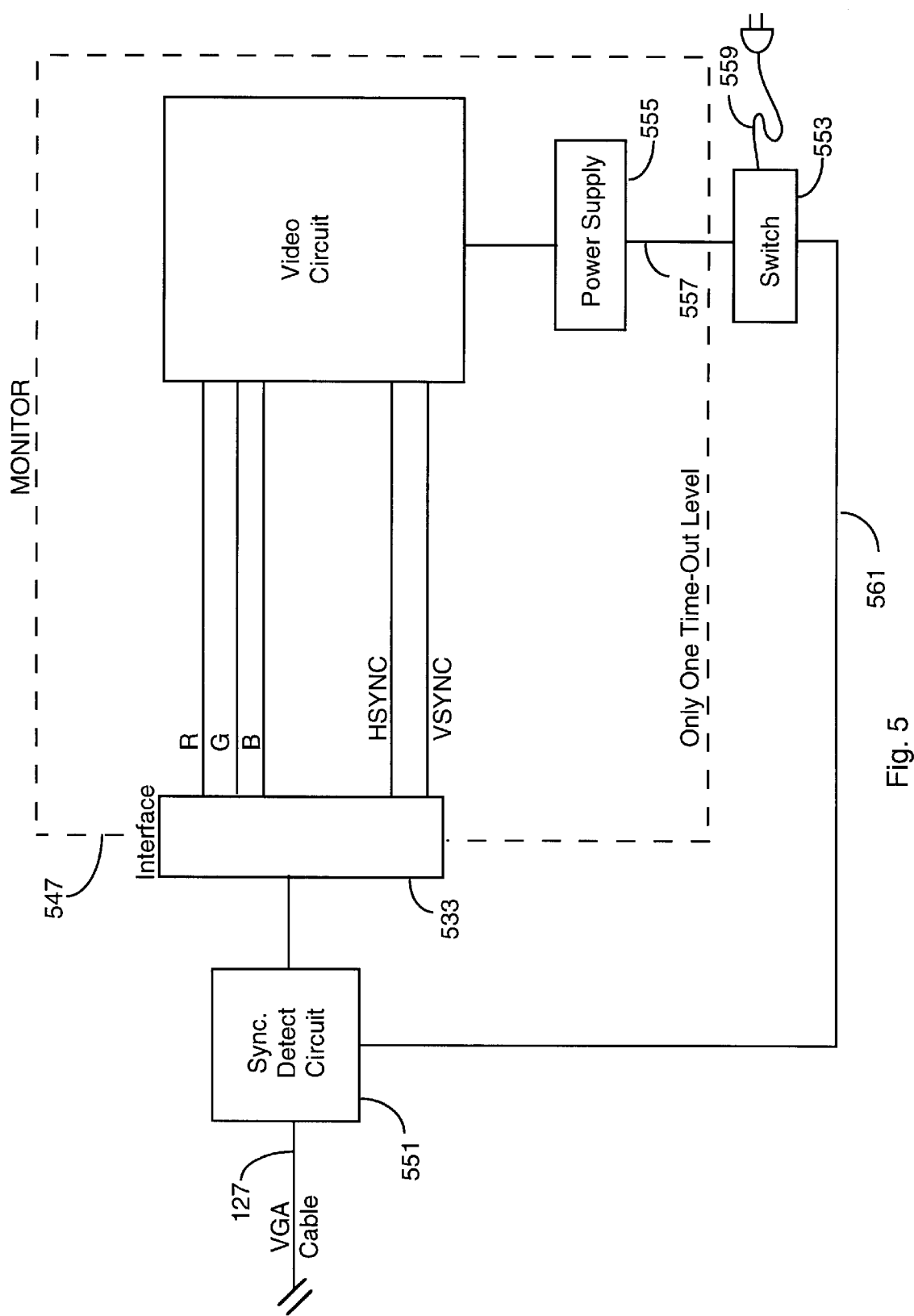
FIG. 5 is a largely schematic representation of an add-on device for controlling AC primary power to a monitor according to another alternative embodiment of the present invention.

FIG. 5 shows another alternative embodiment of the present invention suitable for add-on use with a monitor 547 having an interface 533. A sync detect circuit 551, in an external enclosure having pass-through connections, inserts into VGA cable 127. Sync detect circuit 551 monitors video signals on VGA cable 127 and compares the SYNC interval for one or the other of VSYNC and HSYNC to a time-constant in a manner similar to that described for FIG. 4 above. Loss of the monitored SYNC signal in VGA cable 127 for an interval longer than the time-constant causes sync detect circuit 551 to change the voltage on power-control line 561 to its active level, which in turn causes an electronically-controlled switch 553 to open. Electronically-controlled switch 553 controls AC primary power from an electrical cord 559 to a receptacle for monitor 547 power supply cord 557. When electronically-controlled switch 553 opens, AC power to a DC power supply 555 is lost, thus causing total shutdown of monitor 547. Resumption of SYNC signals in VGA cable 127 video signal causes sync detect circuit 551 to change power-control line 561 to its quiescent state, thus causing electronically-controlled switch 553 to close, which restores AC power input to DC power supply 555 reactivating monitor 547.

It will be apparent to one with skill in the art that there are many changes that might be made without departing from the spirit and scope of the invention. Some of these alternatives have already been described, such as MPM instructions implemented in an OS device driver or TSR routines instead of the BIOS, single-level MPM instead of two-level MPM and an external video monitor power control device. Other methods of signalling MPM state changes to a monitor might include time-based coded sequences of frequency changes in HSYNC or VSYNC, coded values in the color signals, or no color signal for an extended period. Alternative embodiments of MPM routines might allow an operator to control MPM operation through command steps, such as menus, dialog boxes or command lines. Such controls might include shutting down monitor power at will by pressing a "hot key", typing a command line or other program interface step. Other features might allow the operator to change the idle time required to trigger MPM and toggle MPM monitoring on or off. Alternative MPM routines might also require an operator to type a password before enabling the transmission of normal video signals to the video monitor. Alternative devices for both built-in and post-manufacture modification to implement monitor power control might be devised. Embodiments of the present invention for monochromatic and grey-scale video adapters and monitors are also contemplated.

What is claimed is:

1. A video monitor comprising:
   a port for receiving signals from a host computer;
   a detector adapted for detecting, through the port, an indication of inactivity of the host computer; and
   a power manager circuit;
   wherein the power manager circuit causes the video monitor to assume one of at least two reduced-power states in response to the detector detecting the indication of inactivity of the host computer.

2. In a video monitor, a power manager system comprising:
   a detector adapted for detecting, through a communication port, an indication of inactivity of a host computer; and
   a power manager circuit;
   wherein the power manager circuit causes the video monitor to assume one of at least two reduced-power states in response to the detector detecting the indication of inactivity of the host computer.

3. A method for managing power levels in a video monitor having a communication port for receiving signals from a host computer, comprising steps of:
   (a) monitoring signals received at the port for indication of inactivity at the host computer; and
   (b) signaling power mode control circuitry in the video monitor to assume one of at least two reduced-power states in response to inactivity at a host computer.

4. A computer system comprising:

a host computer;

a video monitor adapted to enter at least two reduced power states; and a communication link between the host computer and the video monitor; wherein the video monitor monitors the communication link for indication of inactivity at the host computer, and enters one of the at least two reduced power states in response to the indication of inactivity of the host computer.

* * * * *